United States Patent [19]

Aizawa et al.

[11] Patent Number: 5,206,750
[45] Date of Patent: Apr. 27, 1993

[54] METHOD OF FORMING A COLOR FILTER FOR A LIQUID CRYSTAL COLOR DISPLAY APPARATUS

[75] Inventors: Masanobu Aizawa, Yokohama; Shigekazu Yamauchi; Hisao Sekine, both of Sagamihara; Shinji Kanagawa, Isehara, all of Japan

[73] Assignee: Stanley Electric Co., Ltd., Tokyo, Japan

[21] Appl. No.: 661,458

[22] Filed: Feb. 26, 1991

[30] Foreign Application Priority Data

Feb. 28, 1990 [JP] Japan .................. 2-48093

[51] Int. Cl.$^5$ .................. G02F 1/1335; G02F 1/1343
[52] U.S. Cl. .................. 359/68; 359/88; 205/122
[58] Field of Search .................. 350/336, 334; 359/88, 359/68; 204/180.2; 205/122

[56] References Cited

U.S. PATENT DOCUMENTS

| | | | |
|---|---|---|---|
| 4,586,789 | 5/1986 | Kishimoto et al. | 350/336 |
| 4,764,766 | 8/1988 | Aoyama et al. | 350/333 X |
| 4,935,757 | 6/1990 | Hatano et al. | 350/336 |
| 4,975,145 | 12/1990 | Yamazaki et al. | 350/343 X |
| 5,010,326 | 4/1991 | Yamazaki et al. | 350/333 X |

FOREIGN PATENT DOCUMENTS

| | | |
|---|---|---|
| 59-152421 | 8/1984 | Japan . |
| 60-39617 | 3/1985 | Japan . |
| 61-57930 | 3/1986 | Japan . |
| 61-228421 | 10/1986 | Japan . |

Primary Examiner—William L. Sikes
Assistant Examiner—Ron Trice
Attorney, Agent, or Firm—Weingarten, Schurgin, Gagnebin & Hayes

[57] ABSTRACT

A method is provided for forming a color filter for a liquid crystal display apparatus which requires considerably reduced area on a transparent substrate for performing electrodeposition of the color filter. The method includes coating non-extended liquid crystal driving terminal portions with a protective film with a notch etched therein for exposing an end edge portion of the non-extended driving terminal; and coating the non-extended driving terminals with a transverse strip of conductive material to place the non-extended terminals into a conducting state.

2 Claims, 1 Drawing Sheet

METHOD OF FORMING A COLOR FILTER FOR A LIQUID CRYSTAL COLOR DISPLAY APPARATUS

BACKGROUND OF THE INVENTION

1. Field of the Invention

The present invention relates to a method of forming a color filter to be mounted on a transparent substrate with electrodes of a liquid crystal display apparatus, and more particularly, to the processing of energizing terminal portions in case of using an electrodeposition process.

2. Description of Prior Art

In the case where a color filter is formed on a dot matrix type liquid crystal display apparatus by an electrodeposition process, generally, the color filter is formed, as shown in FIG. 3, by extending crystal driving terminals of electrodes on the signal side, providing terminals 21A, 21B and 21C for conduction during electrodeposition doubled in level by the number of colors to be colored, placing only required electrodes into conduction by conductive material 22A such as conductive tapes, silver paste, etc. from those extended farthest from a display area, immersing transparent electrodes into an electro-deposition bath liquid so that the transparent electrodes face to opposed electrodes in the liquid, and applying a current between the selected transparent electrode and opposed electrode to form a color filter on only the required electrode. When the color filter has been calcinated, the filter will be an insulating article.

Therefore, in the case where the second color electrode is placed in conductive state by a conductive material 22B for electrodeposition and a current is applied between the transparent electrode and the opposed electrode, non-conduction is formed between the first color electrode and the opposed electrode, and only the second color electrode is subjected to electrodeposition. Similarly, when the third color electrode is placed in conductive state by a conductive material for electrodeposition 22c and a current is applied between the transparent electrode and the opposed electrode, the third color electrode is subjected to electrodeposition.

In this manner, a color filter having the required number of colors is formed.

In this case, it is necessary to cover a portion of a liquid crystal driving terminal by a protective material 23 which can be removed later so that a color filter is not formed.

However, in the case of the energizing means as described above, the electrodes doubled in level required for the electrodeposition process are unnecessary portion as LCD panels. Therefore, an area of an LCD panel that can be manufactured by using a glass substrate of the same dimension is small as compared with other color filter forming processes.

For example, in the case where a color filter of three colors is formed, generally, a length of an electrode of 3 to 5 mm per color is required, and therefore, a width of about 9 to 15 mm in total on the glass substrate is required.

Further, when a central portion of a signal electrode is divided in order to increase the number of display lines due to the duty drive, terminals are necessary on both sides of a panel, requiring the width twice of the case where the central portion is not divided.

Furthermore, in the case where the signal electrode is divided and in the case where a plurality of patterns are arranged on one and the same glass substrate in a direction in which terminals are adjacent to each other, the width required by the terminal for electrodeposition further increases.

SUMMARY OF THE INVENTION

It is an object of the present invention to provide a method of forming a color filter for a liquid crystal display apparatus which can considerably reduce an area on a transparent substrate during electrodeposition.

According to the present invention, there is provided a method of forming a color filter, the method comprising extending liquid crystal driving terminal portions of transparent electrodes on a transparent substrate so as to be doubled in level except one color portion to form terminals for electrodeposition, forming the liquid crystal driving terminal portions with a protective film so as to have a notch for exposing an end edge portion of a non-extended driving terminal of one color, forming the exposed portion of the terminal into a terminal for electrodeposition of that color, coating required terminals for electrodeposition with a conductive material having a flow property at the time of electrodeposition to place them in a conductive state, and applying a current between the transparent electrode and the opposed electrode in the electrodeposition bath liquid to form a color filter having a predetermined color on only the predetermined transparent electrode by electrodeposition.

DESCRIPTION OF THE PREFERRED EMBODIMENT

The present invention will be described in detail with reference to the drawings.

Figure 1:
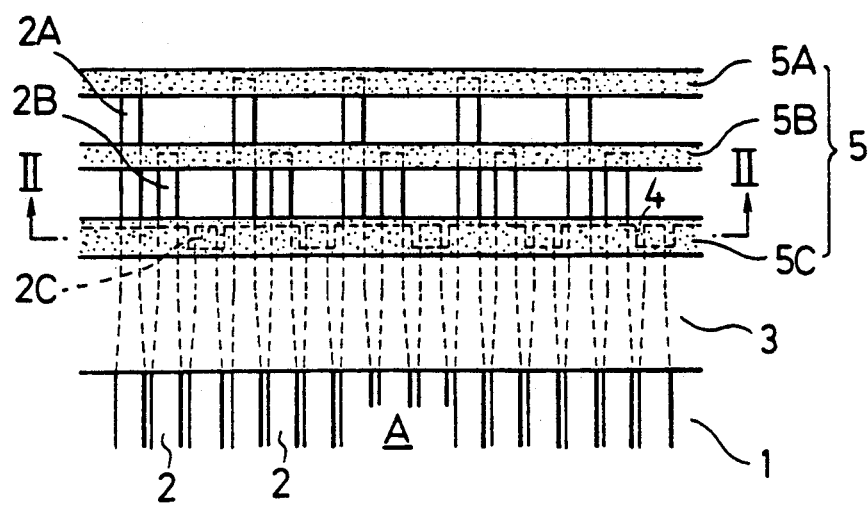
FIG. 1 is a plan view showing an embodiment of the present invention.
Figure 2:
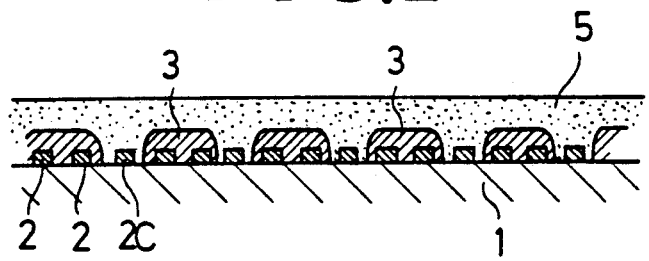
FIG. 2 is a sectional view taken on line II—II of FIG. 1.
Figure 3:
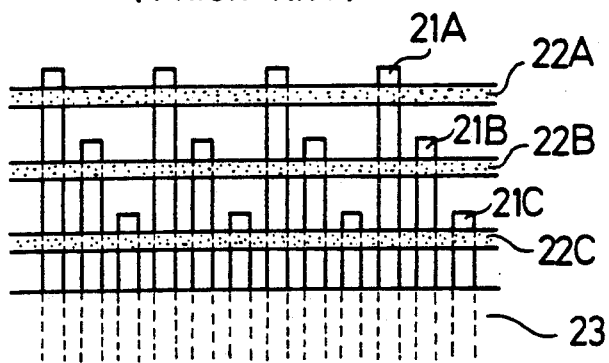
FIG. 3 is a plan view showing a conventional example.

FIGS. 1 and 2 show the case where a 3-color color filter is formed on a glass substrate with transparent electrodes of a dot matrix type LCD by an electrodeposition process. Liquid crystal driving terminals of transparent electrodes 2 on a glass substrate 1 are extended so that two color portions thereof are doubled in level to provide a first color terminal for electrodeposition 2A and a second color terminal for electrodeposition 2B. The liquid crystal driving terminal portion is coated with a protecting photoresist 3. In this case, a notch 4 is provided so that an end edge of a third color terminal is exposed. The exposed terminal portion serves as a third color terminal for electrodeposition 2C. That is, the third color terminal serves as a terminal for liquid crystal drive and electrodeposition. The protective film is formed by photolithography so as to have the notch 4, and is removed by a NaOH aqueous solution after electrodeposition.

On the other hand, a conductive material 5 is coated from a terminal for electrodeposition farthest from a display area A in order that an electrode required when electrodeposition takes place. In the present embodiment, the first color terminal 2A is farthest, and the second color terminal 2B and the third color terminal 2C follow in that order. The conductive material 5 is to be coated at positions indicated at 5A, 5B and 5C. The conductive material 5 comprises a silver paste. This is because of the fact that the silver paste can contact into the terminal with less contact area while maintaining a sufficiently low resistance for electrodeposition.

Thereby, a contact area between the silver paste 5 and the terminals 2A, 2B and 2C can be minimized, and the silver paste 5 is coated on the extreme end of the terminal for electrodeposition whereby even if the length of the terminal for electrodeposition is set to be 2 mm or less per color, a spacing of the silver paste between colors can be secured without any problem.

When the third color terminal 2C is placed in conductive state, the notch 4 is completely filled up due to the flow property of the silver paste to positively prevent the electrodeposition of the color filter to the terminal portion.

The silver paste 5 should be completely removed after a color filter has been electrodeposited in order to prevent short-circuit between terminals. Therefore, the sliver paste formed from a special resin as a binder is dried at a low temperature of 80° to 90° C., and the paste in the form of being coated on the glass substrate 1 is torn off.

As described above, the liquid crystal driving terminal is protected by the photoresist 3, and the required terminals for electrodeposition 2A and 2B or 2C are placed in conductive state by the coating of the siliver paste 5. The thus formed glass substrate 1 is immersed into an electrodeposition bath liquid so that the transparent electrodes face to the opposed electrodes in the liquid, and when a current is applied between the transparent electrodes and the opposed electrodes, a color filter having a predetermined color is formed on only a predetermined transparent electrode by electrodeposition.

Examples of detailed numerical values will be shown below.

In an ITO electrode having a pitch of terminal portions—100 μm, a width of terminal—50 μm, and a sheet resistance—10 Ω/square, a silver paste was coated over the width of 2 mm. A length of a portion exposed from a notch 4 of a photo resist 3 of a third-color electrode 2C for electrodeposition is set to 0.5 mm, and a length of a first and second color terminals for electrodeposition is set to 2 mm and electrodeposition was carried out. Color filters for all of these three colors were formed on the electrodes of a display area.

In this case, the width of the area on the glass substrate required for electrodeposition per one row of terminals is 2 mm for the first color and 2 mm for the second color, 4 mm in total. Considering the conventional process, if the length of terminal per color is set to 3 mm, 9 mm in total results. Therefore, a color filter by the electrodeposition can be formed with a space half or less as compared with the conventional process.

As described above, according to the present invention, the silver past is used as the conductive material, and a protective film for a terminal portion is formed so that a terminal for electrodeposition for one color portion also serves as a liquid crystal driving terminal portion. Therefore, an area of an energizing terminal portion required for electrodeposition can be considerably reduced, and a rate of an effective display space occupied on the glass substrate can be considerably increased. Accordingly, it is possible to manufacture a number of liquid crystal panels on one and the same substrate, thus greatly contributing to the reduction in the manufacturing cost.

What is claimed is:

1. A method of forming a color filter, the method comprising the steps of:

forming on a transparent substrate a plurality of groups of liquid crystal driving terminal portions of transparent electrodes, each group having as many extended terminal portions of staggered lengths as one less than the number of colors to be filtered and each group having one non-extended terminal portion, thereby providing a plurality of terminals for electrodeposition;

forming a protective film so as to cover selected portions of the transparent electrodes including each of said non-extended terminal portions;

forming a plurality of notches for exposing an end edge portion of each of said non-extended terminals;

for each color filter portion to be formed, coating end edge portions of all terminals for electrodeposition associated with the color filter portion to be formed with a transverse strip of a conductive material that is to be electrically energized at the time of electrodeposition, so as to place the terminals for electrodeposition associated with the color filter portion to be formed in a conducting state and applying a current between transparent electrodes of the terminal associated with the color filter portion to be formed and opposed electrodes in an electrodeposition bath liquid to form by electrodeposition a color filter portion having a predetermined color on only the transparent electrodes that are in a conducting state.

2. A method of forming a color filter according to claim 1, wherein said conductive material comprises a silver paste.

* * * * *

UNITED STATES PATENT AND TRADEMARK OFFICE
CERTIFICATE OF CORRECTION

PATENT NO. : 5,206,750
DATED : April 27, 1993
INVENTOR(S) : Masanobu Aizaw, et al.

It is certified that error appears in the above-indentified patent and that said Letters Patent is hereby corrected as shown below: On the title page, and Column 1, lines 1-5.

In the Title, "METHOD OF FORMING A COLOR FILTER FOR A LIQUID CRYSTAL COLOR DISPLAY APPARATUS" should read --A METHOD OF FORMING A COLOR LIQUID CRYSTAL DISPLAY HAVING REDUCED TERMINAL AREA--.

Column 4, lines 33-34, "terminals;" should read --terminals; and--.

Signed and Sealed this

Twenty-first Day of June, 1994

Attest:

BRUCE LEHMAN

*Attesting Officer*     *Commissioner of Patents and Trademarks*